US012812330B2

(12) United States Patent
Kahn et al.

(10) Patent No.: US 12,812,330 B2
(45) **Date of Patent: *Nov. 24, 2026**

(54) ENHANCED MOBILE DEVICE CONNECTIVITY BETWEEN WIRELESS NETWORKS

(71) Applicant: Ruckus IP Holdings LLC, Horsham, PA (US)

(72) Inventors: Michael R. Kahn, Cherry Hill, NJ (US); Linh Nguyen, Broomall, PA (US); John D. Ogden, Media, PA (US); Ramesh Manikandan Kumarasamy, Upper Chichester, PA (US); Dave Scott Swingle, Moorestown, NJ (US)

(73) Assignee: Ruckus IP Holdings LLC, Sunnyvale, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 18/657,186

(22) Filed: May 7, 2024

(65) Prior Publication Data

US 2024/0292306 A1 Aug. 29, 2024

Related U.S. Application Data

(63) Continuation of application No. 17/241,341, filed on Apr. 27, 2021, now Pat. No. 12,015,961.

(Continued)

(51) Int. Cl.

| | |
|---|---|
| ***H04W 4/024*** | (2018.01) |
| ***H04W 36/00*** | (2009.01) |
| ***H04W 36/32*** | (2009.01) |

(52) U.S. Cl.

CPC ..... *H04W 4/024* (2018.02); *H04W 36/00835* (2018.08); *H04W 36/00837* (2018.08);

(Continued)

(58) Field of Classification Search

USPC .......................................................... 370/331

See application file for complete search history.

(56) References Cited

U.S. PATENT DOCUMENTS

| | | | | |
|---|---|---|---|---|
| 5,537,679 | A | 7/1996 | Crosbie | |
| 9,766,671 | B2 * | 9/2017 | Dorn | B60L 53/62 |

(Continued)

OTHER PUBLICATIONS

International Search Report and the Written Opinion of the International Searching Authority dated Jul. 13, 2021 in International (PCT) Application No. PCT/US2021/029295.

(Continued)

*Primary Examiner* — Gregory B Sefcheck
*Assistant Examiner* — Majid Esmaeilian
(74) *Attorney, Agent, or Firm* — MH2 Technology Law Group LLP

(57) ABSTRACT

A network device for enhanced mobile device network connectivity to wireless networks is provided that includes a user interface, a hardware processor, and a non-transitory memory configured to store one or more programs. The hardware processor executes the one or more programs to store a map of wireless networks, calculate a route of travel for an electronic device, and determine a list of wireless networks connectable to the electronic device. A schedule is created for connecting the electronic device to the wireless networks on the list and connecting the electronic device to a first one of the wireless networks on the schedule along the route. The electronic device switches sequentially from the first one of the wireless networks to a next one of the wireless networks in the schedule so the electronic device is connected to at least one of the wireless networks on the schedule while moving along the route.

18 Claims, 6 Drawing Sheets

Related U.S. Application Data

(60) Provisional application No. 63/036,111, filed on Jun. 8, 2020.

(52) U.S. Cl.
CPC .... *H04W 36/32* (2013.01); *H04W 36/008375* (2023.05); *H04W 36/322* (2023.05)

(56) References Cited

U.S. PATENT DOCUMENTS

| | | | | |
|---|---|---|---|---|
| 11,466,997 | B1 | 10/2022 | Williams | |
| 2007/0142050 | A1 | 6/2007 | Handforth et al. | |
| 2009/0245199 | A1 | 10/2009 | Pathan et al. | |
| 2010/0246534 | A1* | 9/2010 | Vargantwar | H04W 36/385 370/332 |
| 2014/0274069 | A1 | 9/2014 | Scheim et al. | |
| 2016/0142477 | A1* | 5/2016 | Kawazoe | H04L 67/1004 709/203 |
| 2016/0162783 | A1* | 6/2016 | Tan | H04W 24/02 706/13 |
| 2017/0085437 | A1 | 3/2017 | Condeixa | |
| 2017/0215121 | A1 | 7/2017 | Condeixa et al. | |
| 2017/0289791 | A1 | 10/2017 | Yoo | |
| 2018/0124805 | A1* | 5/2018 | Tonshal | H04L 47/826 |
| 2018/0206105 | A1 | 7/2018 | Fang | |
| 2018/0220349 | A1 | 8/2018 | Watanabe | |
| 2018/0234901 | A1* | 8/2018 | Suh | H04W 36/322 |
| 2018/0262924 | A1 | 9/2018 | Dao | |
| 2020/0178137 | A1 | 6/2020 | Hassan Hussein | |
| 2020/0324497 | A1* | 10/2020 | Tardiff | B60C 7/146 |
| 2020/0393256 | A1* | 12/2020 | Sahin | G01C 21/3438 |
| 2021/0014755 | A1* | 1/2021 | Caceres | H04W 36/0038 |
| 2021/0020047 | A1* | 1/2021 | Kuhn | G06Q 30/0205 |
| 2021/0099941 | A1 | 4/2021 | Catalli | |
| 2021/0329514 | A1* | 10/2021 | Chin | H04W 36/0033 |
| 2021/0390535 | A1* | 12/2021 | Itoh | G06Q 20/3821 |
| 2022/0014977 | A1 | 1/2022 | Otaka | |
| 2022/0070686 | A1* | 3/2022 | Vemuri | H04W 36/322 |
| 2023/0337263 | A1 | 10/2023 | Eleftheriadis | |

OTHER PUBLICATIONS

International Preliminary Report on Patentability dated Dec. 13, 2022 in International (PCT) Application No.

* cited by examiner

43

44

| ACCESS POINT AA POSITION-COST SCHEDULE | |
|---|---|
| LOCATION | CFV |
| 30 | 5 |
| 31 | 1 |
| 32 | 2 |
| 33 | 2 |
| 34 | 4 |
| 35 | 5 |

*FIG. 5*

45

44

| ACCESS POINT BB POSITION-COST SCHEDULE | |
|---|---|
| LOCATION | CFV |
| 31 | 5 |
| 32 | 4 |
| 33 | 3 |
| 34 | 2 |
| 35 | 1 |
| 36 | 1 |
| 37 | 1 |
| 38 | 3 |
| 39 | 4 |
| 40 | 5 |

*FIG. 6*

46

44

| ACCESS POINT CC POSITION-COST SCHEDULE | |
|---|---|
| LOCATION | CFV |
| 36 | 5 |
| 37 | 4 |
| 38 | 2 |
| 39 | 2 |
| 40 | 1 |
| 41 | 5 |

*FIG. 7*

47

49

| CONNECTION SCHEDULE | | |
|---|---|---|
| LOCATION | ACCESS POINT 48 | SWITCH TIME |
| 30-31 | AA | ---------- |
| 31 | AA | ---------- |
| 32 | AA | ---------- |
| 33 | AA | ---------- |
| 34 | BB | 2:30 PM |
| 35 | BB | ---------- |
| 35-36 | BB | ---------- |
| 36 | BB | ---------- |
| 37 | BB | ---------- |
| 38 | CC | 3:30 PM |
| 39 | CC | ---------- |
| 40 | CC | ---------- |
| 40-41 | CC | ---------- |

*FIG. 8*

ENHANCED MOBILE DEVICE CONNECTIVITY BETWEEN WIRELESS NETWORKS

CROSS-REFERENCE TO RELATED APPLICATIONS

This application is a continuation of U.S. application Ser. No. 17/241,341, filed Apr. 27, 2021, which claims priority to U.S. provisional Application No. 63/036,111, filed Jun. 8, 2020, the entire contents of which is fully incorporated herein by reference.

TECHNICAL FIELD

The subject matter of the present disclosure relates generally to enhanced mobile device connectivity between wireless networks.

BACKGROUND

Wireless networks for providing services to mobile devices are prevalent in many areas. Typically, mobile devices connect to a wireless network to receive services and tend to disconnect from the wireless network when out of range (e.g., when moving). After disconnecting, a search for a new network may be performed automatically by the mobile device or may require user interaction to connect to the new network. The operation for locating the new network to connect to can take some time and therefore result in intermittent service outages and otherwise poor overall service to mobile devices.

Users who operate their mobile devices while commuting, for example, by bike, train, subway, automobile, and/or bus are known to experience several such network service outages, which can be inconvenient, frustrating, and result in lost productivity. Therefore, known techniques for switching of mobile devices between wireless networks while traveling have clear drawbacks.

Thus, it would be advantageous and an improvement over the relevant technology to provide a device, method, and computer-readable recording medium capable of seamlessly connecting to and disconnecting from wireless networks while traveling so as to provide continuous wireless network services to mobile devices at all times along a route of travel.

SUMMARY

An aspect of the present disclosure provides a mobile device for enhanced wireless network connectivity. The mobile device includes a user interface, a hardware processor, and a non-transitory memory configured to store one or more programs. The hardware processor executes the one or more programs to store a map of wireless networks received from a server, calculate a route of travel for the mobile device, and determine a list of wireless networks connectable to the mobile device based on the map and the route of travel. Additionally, the hardware processor executes the one or more programs to create a schedule for connecting the mobile device to the wireless networks on the list and connect the mobile device to a first one of the wireless networks on the schedule along the route of travel. The mobile device switches sequentially from the first one of the wireless networks to a next one of the wireless networks in the schedule so the mobile device is connected to at least one of the wireless networks on the schedule while moving along the route of travel.

In an aspect of the present disclosure the hardware processor executes the one or more programs to create the schedule based on optimization factors including signal strength, available bandwidth and connection cost.

In another aspect of the present disclosure, when the hardware processor determines the list of wireless networks, the hardware processor further executes the one or more programs to determine locations along the route of travel of access points for each wireless network on the list of wireless networks connectable to the mobile device.

In another aspect of the present disclosure, when the hardware processor creates the schedule, the hardware processor further executes the one or more programs to select one access point for each location along the route of travel based on the optimization factors.

In another aspect of the present disclosure, when the hardware processor calculates the route of travel, the hardware processor further executes the one or more programs to determine a mode of transportation based on a current location and historical velocity of the mobile device.

In another aspect of the present disclosure, the hardware processor further executes the one or more programs to display a warning message when none of the networks on the list of wireless networks is available at a location along the route of travel.

An aspect of the present disclosure provides a method for enhanced mobile connectivity between wireless networks that includes storing, using a mobile device, a map of wireless networks, calculating, using the mobile device, a route of travel for the mobile device, and determining, using the mobile device, a list of wireless networks connectable to the mobile device based on the map and the route of travel. The method also includes creating a schedule for connecting the mobile device to the wireless networks on the list, connecting the mobile device to a first one of the wireless networks on the schedule along the route of travel, and switching sequentially from the first one of the wireless networks to a next one of the wireless networks in the schedule so the mobile device is connected to at least one of the wireless networks on the schedule while moving along the route of travel.

In an aspect of the present disclosure the method includes creating the schedule based on optimization factors including signal strength, available bandwidth and connection cost.

In an aspect of the present disclosure, the method includes determining locations along the route of travel of access points for each wireless network on the list of wireless networks connectable to the mobile device.

In an aspect of the present disclosure, the method includes selecting one access point for each location along the route of travel based on the optimization factors.

In an aspect of the present disclosure, the method includes determining a mode of transportation based on a current location and historical velocity of the mobile device.

In an aspect of the present disclosure, the method includes displaying, using the mobile device, a warning message when none of the networks in the list of wireless networks is available at a location along the route of travel.

In an aspect of the present disclosure, the unavailability of a network on the list of wireless networks is based on information received from a network monitoring server.

An aspect of the present disclosure provides a non-transitory computer-readable recording medium in a mobile device for enhanced mobile device wireless network connectivity. The non-transitory computer-readable recording medium stores one or more programs which when executed by a hardware processor performs the steps of the methods described above.

BRIEF DESCRIPTION OF THE DRAWINGS

In the drawings, like reference numbers generally indicate identical, functionally similar, and/or structurally similar elements.

FIG. 5 is an exemplary position-cost schedule for an access point including exemplary locations along the route of travel and corresponding cost function values;

FIG. 6 is another exemplary position-cost schedule for another access point including exemplary locations along the route of travel and corresponding cost function values;

FIG. 7 is yet another exemplary position-cost schedule for yet another access point including exemplary locations along the route of travel and corresponding cost function values;

FIG. 8 is an exemplary connection schedule that includes exemplary locations along the route of travel and corresponding access points.

DETAILED DESCRIPTION

The following detailed description is made with reference to the accompanying drawings and is provided to assist in a comprehensive understanding of various exemplary embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
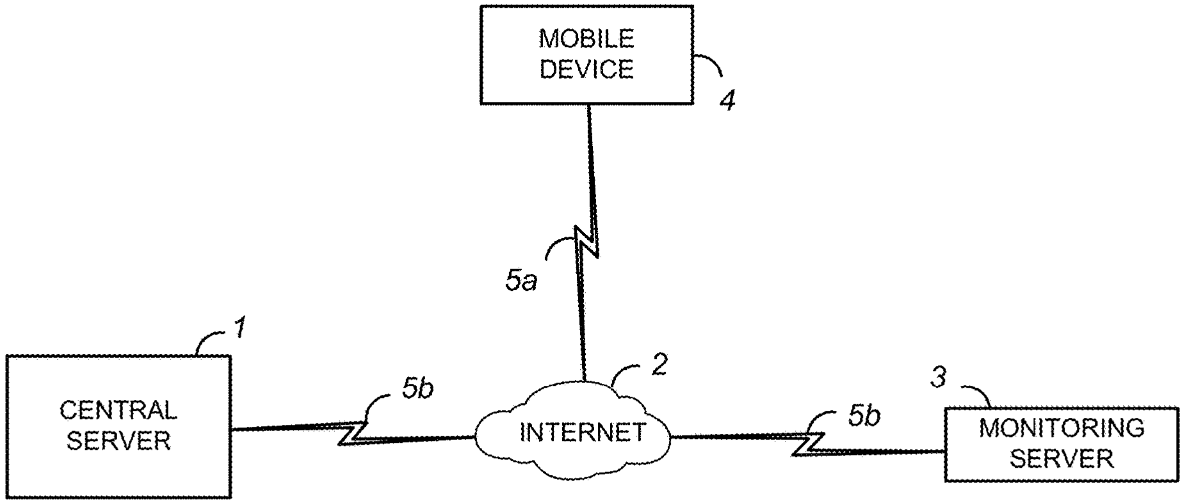
FIG. 1 is a schematic diagram illustrating an exemplary system for enhanced mobile device connectivity between wireless networks according to an embodiment of the present disclosure.

FIG. 1 is a schematic diagram illustrating an exemplary system for enhanced mobile device connectivity between wireless networks according to an embodiment of the present disclosure. As shown in FIG. 1, the main elements of the system include a central server 1, a monitoring server 3 or personal computer (PC), and a mobile device 4 all communicatively connected via the Internet 2.

Starting from the top of FIG. 1, the mobile device 4 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnecting with other devices via Wi-Fi and Bluetooth protocols. The connection 5*a* between the mobile device 4 and the Internet 2 can be implemented to establish connections using protocols in accordance with, but not limited to, a wide area network (WAN), a wireless local area network (WLAN), a virtual private network (VPN), metropolitan area networks (MANs), system area networks (SANs), a public switched data network (PSDN), a global Telex network, or a 2G, 3G, 4G or 5G network, for example.

Additionally, the connection 5*a* can be implemented to establish connections using protocols in accordance with, but not limited to, IEEE 802.11 Wi-Fi protocols, Bluetooth protocols, Bluetooth Low Energy (BLE), or other short-range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. The connection 5*a* can also be implemented using a wireless connection that operates in accordance with, but is not limited to, RF4CE protocol, ZigBee protocol, Z-Wave protocol, or IEEE 802.15.4 protocol.

The connection 5*b* between the Internet 2 and the central server 1 and between the Internet 2 and the monitoring server 3 can be implemented to establish connections using protocols in accordance with a WAN, a VPN, MANs, SANs, a DOCSIS network, a fiber optics network (such as FTTH (fiber to the home), FTTX (fiber to the x), or HFC (hybrid fiber-coaxial)), a PSDN, a global Telex network, or a 2G, 3G, 4G or 5G network, for example.

The central server 1 may be any type of server or computer implemented as a network server or network computer for providing various shared resources to other devices connected to the network via the Internet 2. For example, in this case, the central server 1 can store a network map and an optimal network connection application that uses the network map to enhance the connectivity of the mobile device 4 to available networks. The network map and associated data and the optimal network connection application can be accessed by, for example, technical support persons, or other administrative or management persons and/or devices. An analysis of the network map data stored in the central server 1 can be used to enhance the connectivity of the mobile device 4 to wireless networks while the mobile device 4 moves along a route of travel.

It is contemplated by the present disclosure that the network map can include access points for connecting to different networks along a route of travel, the footprint of each access point, and the cost for connecting to each access point. Additionally, the central server 1 can monitor connections and conditions reported by mobile devices 4 and use these to form a more accurate estimation of network conditions at any point on the network map. As the central server 1 updates the network map, all of the mobile devices 4 connected to the central server 1 would receive updates to the network map.

The monitoring server/PC 3 may be any type of server or network computer implemented as a management device for communicating, monitoring, and managing other devices (e.g., router, modems, switches, servers, gateway and other similar devices) connected in a network using a management protocol. For example, the monitoring server/PC 3 can be a simple network management protocol (SNMP) management device implementing the use of an SNMP protocol. The SNMP protocol is an Internet standard protocol for collecting, organizing, and modifying information for the managed devices in the network. The managed devices (e.g., router, modems, switches, servers, gateway and other similar devices) by the monitoring server/PC 3 would also support the use of the same or similar protocol such as the SNMP protocol.

By using a management protocol such as the SNMP protocol, the monitoring server/PC 3 can send queries, receive responses, set variables, and monitor and acknowledge events with respect to the managed devices. For example, the monitoring server/PC 3 can detect networks experiencing outages and/or malfunctions so are unavailable. The monitoring server/PC 3 can implement the use of a management software or agent (e.g., NET-SNMP or MG-SOFT) for performing communicating, monitoring, and management functions related to the managed devices.

Figure 2:
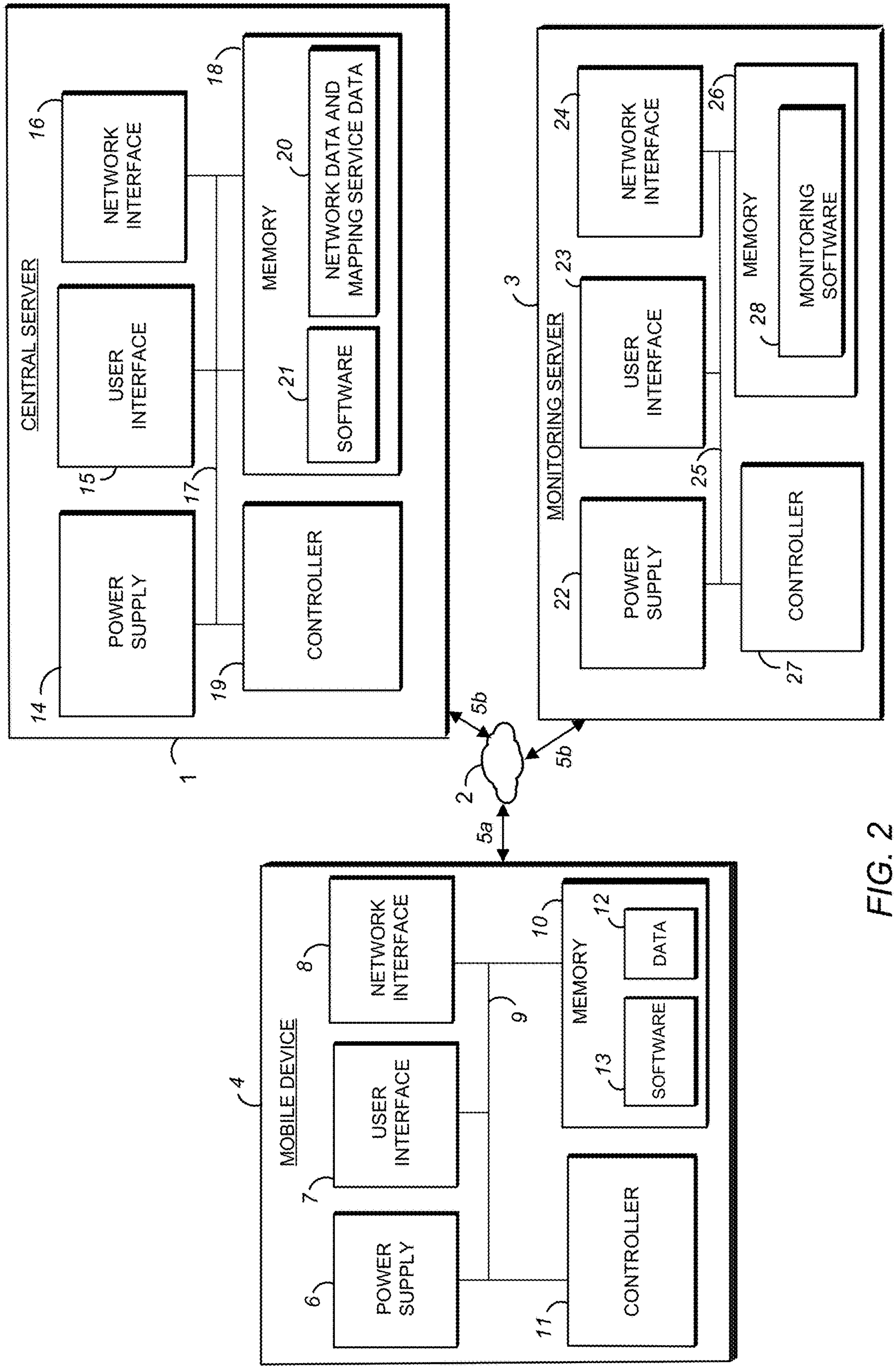
FIG. 2 is a more detailed schematic diagram illustrating an exemplary mobile device, central server, and monitoring server in the system of FIG. 1.

A detailed description of the exemplary internal components of the central server 1, the mobile device 4, and the monitoring server/PC 3 shown in FIG. 1 will be provided in the discussion of FIG. 2. However, in general, it is contemplated by the present disclosure that the central server 1, mobile device 4, and the monitoring server/PC 3 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the central server 1, the mobile device 4, and the monitoring server/PC 3 may be adapted to execute any operating system, including Linux, UNIX, Windows, MacOS, DOS, and ChromOS as well as virtual machines adapted to virtualize execution of a particular operating system, including customized and proprietary operating systems. The central server 1, the mobile device 4, and the monitoring server/PC 3 are further equipped with components to facilitate communication with other computing devices over the one or more network connections to local and wide area networks, wireless and wired networks, public and private networks, and any other communication network enabling communication in the system.

FIG. 2 is a more detailed schematic diagram illustrating an exemplary mobile device 4, central server 1, and monitoring server/PC 3 for enhanced connectivity of the mobile device 4 to wireless networks according to an embodiment of the present disclosure. Although FIGS. 1 and 2 show only one monitoring server/PC 3, one central server 1, and one mobile device 4, it is contemplated by the present disclosure that more than one monitoring server/PC 3, central server 1, and mobile device 4 can be implemented. The monitoring server/PC 3, central server 1, and mobile device 4 shown in FIGS. 1 and 2 are meant to be representative of the network devices that can be implemented to achieve the features of the different aspects and embodiments described in the present disclosure.

Now referring to FIG. 2, the mobile device 4 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnecting with other devices via Wi-Fi and Bluetooth protocols. As shown in FIG. 2, the mobile device 4 includes a power supply 6, a user interface 7, a network interface 8, a memory 10, and a controller 11.

The power supply 6 supplies power to the internal components of the mobile device 4 through the internal bus 9. The power supply 6 can be a self-contained power source such as a battery pack with an interface to be powered through an electrical charger connected to an outlet (e.g., either directly or by way of another device). The power supply 6 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 7 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the mobile device 4. The network interface 8 includes various network cards, and circuitry implemented in software and/or hardware to enable communications using the protocols in accordance of connection 5*a* (e.g., as previously described with reference to FIG. 1).

The memory 10 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 10 can be used to store data 12, including for example, a network map, travel map information that includes previous routes traveled by the mobile device 4, historical movement data of the mobile device 4, information related to optimization factors, and other device and network data associated with optimizing connections of the mobile device 4 to wireless networks while moving along a route of travel.

Optimization factors can include but are not limited to, the strength of a signal received from an access point, the connection time to an access point, the available bandwidth of an access point, and the costs of connecting to an access point. Information related to optimization factors may include, but is not limited to, access point position-cost schedules and connection schedules.

Additionally, the memory 10 can be used to store software 13 including a route predicting application, an optimal network connection application and any type of instructions associated with algorithms, processes, or operations related to optimizing connections of the mobile device 4 to wireless networks while moving along a route of travel and for controlling the general functions and operations of the mobile device 4.

The network map may be a database that includes data for wireless network access points. The data for each access point includes, but is not limited to, location, operating range, a model of available bandwidth, and connection costs. For example, the network map can include access points for connecting to different networks along a route of travel, the coverage area or footprint of each access point, and the cost for connecting to each access point. Additionally, the central server 1 can monitor connections and conditions reported by mobile device 4 and use these to form a more accurate estimation of network conditions at any point on the network map. As the central server 1 updates the network map, all of the mobile device 4 connected to the central server 1 would receive updates to the network map.

The route predicting application calculates a route of travel of the mobile device 4 and the optimal network connection application calculates a connection schedule that includes an optimal set or list of access points for the mobile device 4 to connect to along the route of travel, as well as times for connecting. It should be understood that by virtue of connecting to an access point, the mobile device 4 connects to the wireless network associated with the access point.

The optimal network connection application may also perform a cost function for calculating a cost function value for each location along a route of travel. For each location along a route of travel, the optimization factors are evaluated for each access point and associated connectable network along the route of travel to calculate a cost function value for each location.

The controller 11 controls the general operations of the mobile device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the mobile device 4. Communication between the components (e.g., 6-8, 10 and 11) of the mobile device 4 is established using the internal bus 9.

The central server 1 may be any type of server or computer implemented as a network server or network computer for providing a map service and various shared resources to other devices connected to the network via the Internet 2. As shown in FIG. 2, the central server 1 includes a power supply 14, a user interface 15, a network interface 16, a memory 18, and a controller 19.

The power supply 14 supplies power to the internal components of the central server 1 through the internal bus 17. The power supply 14 can be a self-contained power source such as a battery pack with an interface to be powered through an electrical charger connected to an outlet (e.g., either directly or by way of another device). The power supply 14 can also include a rechargeable battery that can be detached allowing for replacement such as a NiCd, a NiMH, a Li-ion, or a Li-pol battery.

The user interface 15 includes, but is not limited to, push buttons, a keyboard, a keypad, an LCD, a CRT, a TFT, an LED, an HD or other similar display device including a display device having touch screen capabilities so as to allow interaction between a user and the central server 1. The network interface 16 includes various network cards, and circuitry implemented in software and/or hardware to enable communications using the protocols in accordance with connection 5*b* (e.g., as previously described with reference to FIG. 1).

The memory 18 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 18 can be implemented to store any type of data 20, for example, the network map and any type of mapping data necessary to implement a mapping service.

Such mapping data may include road maps and maps for rail routes, bus routes, and pedestrian and bicycle routes. The mapping data may also include velocities of modes of transport along such roads and routes. The network map stored in the memory 18 is downloadable to the mobile device 4 and is the same network map described herein with regard to the memory 10 of the mobile device 4. Although the network map is stored in the memory 18 of the central server 1, it is contemplated by the present disclosure that the network data may alternatively, or additionally, be stored amongst many different devices.

Additionally, the memory 18 can be implemented to store software 21 including any type of instructions, for example, the route predicting application and the optimal network connection application described herein with regard to the memory 10 of the mobile device 4, and software associated with algorithms, processes, or operations related to optimizing connections of the mobile device 4 to wireless networks while moving along a route of travel and for controlling the general functions and operations of the central server 1.

The route predicting application and the optimal network connection application stored in the memory 18 are downloadable to the mobile device 4 and are the same applications described herein with regard to the memory 10 of the mobile device 4. Although described as two applications herein, it is contemplated by the present disclosure that the route predicting application and the optimal network connection application may alternatively, or additionally, be combined and provided as a single application stored in the memory 18. Such a combined application would also be downloadable to the mobile device 4 for storage in the memory 10.

The controller 19 controls the general operations of the central server 1 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the central server 1. Communication between the components (e.g., 14-16, 18 and 19) of the central server 1 is established using the internal bus 17.

The monitoring server/PC 3 may be any type of server or network computer implemented as a management device for communicating, monitoring, and managing other devices (e.g., router, modems, switches, servers, gateway and other similar devices) connected in a network using a management protocol. For example, the monitoring server/PC 3 can be a simple network management protocol (SNMP) management device implementing the use of an SNMP. The SNMP protocol is an Internet standard protocol for collecting, organizing, and modifying information for the managed devices in the network. The managed devices (e.g., router, modems, switches, servers, gateway and other similar devices) by the monitoring server/PC 3 would also support the use of the same or similar protocol such as the SNMP protocol. Additionally, or alternatively, the monitoring server/PC 3 can be a TR-069 protocol management device implementing the use of TR-069 protocol. TR-069 (i.e., Technical Report 069) is a technical specification of the Broadband Forum that defines an application layer protocol for remote management of customer-premises equipment (CPE) connected to an Internet Protocol (IP) network.

By using a management protocol such as the SNMP or TR-069 protocols, the monitoring server/PC 3 can send queries, receive responses, set variables, and monitor and acknowledge events with respect to the managed devices. For example, the monitoring server/PC 3 can detect network congestion, outages and/or malfunctions. The monitoring server/PC 3 can implement the use of a management software or agent (e.g., NET-SNMP or MG-SOFT) for performing communicating, monitoring, and management functions related to the managed devices. As shown in FIG. 2, the monitoring server/PC 3 includes a power supply 22, a user interface 23, a network interface 24, a memory 26, and a controller 27.

The power supply 22 supplies power to the internal components of the monitoring server/PC 3 through the internal bus 25. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery.

The user interface 23 includes, but is not limited to, push buttons, a keyboard, a keypad, an LCD, a CRT, a TFT, an LED, an HD or other similar display device including a display device having touch screen capabilities so as to allow interaction between a user and the monitoring server/PC 3. The network interface 24 includes various network cards, and circuitry implemented in software and/or hardware to enable communications using the protocols of connection 5*b* (e.g., as previously described with reference to FIG. 1).

The memory 26 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 26 can be implemented to store data, data packets, logs, log files, or other files related to the operation and activities performed by the mobile device 4 and/or other managed devices in the system. The configuration data, data packets, logs, log files, or other files can accessed by, for example, technical support persons, a webmaster, or other administrative or management persons and/or devices.

An analysis of the information stored in the monitoring server/PC 3 can be used to examine the operation and activities of the mobile device 4 and other network devices connected in the system. For example, the information can be analyzed to determine access points that are congested, experiencing outages or are otherwise unavailable and to determine alternative available access points for connection. For the available access points, the monitoring server/PC 3 may determine information related to optimization factors like signal strength and available bandwidth and may transmit such information to the mobile device 4.

Additionally, the memory 26 can be used to store monitoring software 28 and any type of instructions associated with algorithms, processes, or operations for controlling the general functions and operations of the monitoring server/PC 3 in accordance with the different aspects and embodiments described in the present disclosure.

The controller 27 controls the general operations of the monitoring server/PC 3 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the monitoring server/PC 3. Communication between the components (e.g., 22-24, 26 and 27) of the monitoring server/PC 3 is established using the internal bus 26.

Figure 3:
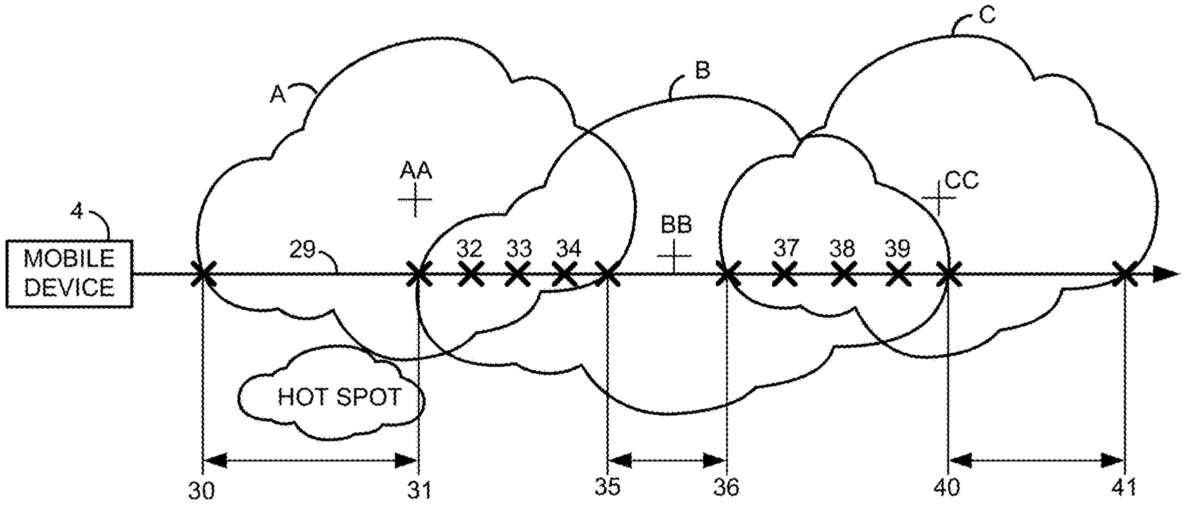
FIG. 3 is a diagram illustrating the mobile device, an exemplary route of travel for the mobile device, and exemplary wireless networks that the mobile device may sequentially switch between while moving along the route of travel.

FIG. 3 is a diagram illustrating the mobile device 4, an exemplary route of travel 29 for the mobile device 4, and exemplary access points AA, BB, CC and corresponding wireless networks A, B, C that the mobile device 4 may sequentially switch connections between while moving along the route of travel 29.

The route of travel 29 is calculated based on movement data of the mobile device 4. More specifically, the route of travel 29 may be calculated by comparing movement data of the mobile device 4 against historical movement data of the mobile device 4, corresponding data for different modes of transportation, and the mapping data stored in the memory 18 of the central server 1. Such movement data includes, but is not limited to, the current location, acceleration, velocity, and heading of the mobile device 4. The locations may be calculated using global positioning coordinates (GPS) or in any other manner.

The current movement data may be evaluated to determine consistency with different modes of travel like automobile, bicycle, pedestrian, bus or rail. For example, for an acceleration from twenty (20) miles per hour (mph) to sixty-five (65) mph in under ten (10) seconds, a velocity of sixty-five (65) mph, and a location near or on a highway the mode of transportation may be an automobile. For a lower acceleration and velocity at the same location the mode of transportation may be a bus. If consistent with an automobile, the current location and heading may be compared against road map data to determine whether the mobile device 4 is following a particular road. If so, the particular road may be the route of travel 29.

For movement data consistent with bicycle travel or walking, the mobile device movement data may be compared against bicycle and/or pedestrian trail data to determine if the mobile device 4 is following a particular bicycle or pedestrian trail. If so, the particular trail may be the route of travel 29. Similarly, the mobile device movement data may be compared against bus route and rail route data to determine the route of travel 29. It is contemplated by the present disclosure that some movement data, for example, acceleration and velocity, may be used for determining consistency with a mode of transportation while other movement data, for example, location and heading, may be used for determining the actual route of travel. Some movement data, for example, location may be used for both.

The route of travel 29 may also be a predetermined route entered by the user operating the mobile device 4. It is contemplated by the present disclosure, that the route of travel 29 may be determined in any manner using movement data of the mobile device 4.

The wireless networks A, B, C may be any type of wireless network that is connectable to the mobile device 4 while the mobile device 4 moves along the route of travel 20. For example, the wireless networks A, B, C can be implemented using the Internet, a local area network (LAN), wireless local area network (WLAN), a WAN, a VPN, MANs, SANs, wireless SANs, PSDN, a global Telex network, or a 2G, 3G, 4G or 5G network, for example. FIG. 3 shows three exemplary access points AA, BB, and CC for three exemplary wireless networks A, B, and C, respectively. Although FIG. 3 shows only three access points AA, BB, CC and only three wireless networks A, B, C, it is contemplated by the present disclosure that more than three access points and three wireless networks can be implemented.

The route of travel 29 includes points 30-41 that represent different exemplary locations along the route 29 at which the mobile device 4 may connect to wireless networks A, B, C. As shown in FIG. 3, at point 30 and between points 30 and 31, a hot spot proximate the route of travel 29 is out of range so the mobile device 4 may connect only to network A via access point AA. Between points 31 and 35, the mobile device 4 may connect to network A or B via respective access points AA or BB. Between points 35 and 36, the mobile device 4 may connect only to network B via access point BB. Between points 36 and 40, the mobile device 4 may connect to network B or C via respective access points BB or CC, and between points 40 and 41, the mobile device 4 may connect only to network C via access point CC.

Typically, the mobile device 4 connects to one of the connectable wireless networks A, B, C while moving along the route of travel 29 to receive services, but then disconnects from the wireless networks A, B, C when out of range. After being disconnected from a wireless network A, B, C, it can take time to find and connect to a new wireless network A, B, C, which can result in interruptions in services.

To address this problem, the mobile device 4 of the present disclosure creates a connection schedule for seamlessly switching connections between the mobile device 4 and the connectable wireless networks A, B, C via the respective access points AA, BB, CC at all locations along the route of travel 29 so as to provide continuous quality wireless network services when traveling. For example, the schedule can allow the mobile device 4 to connect to at least one of the wireless networks A, B, C at all times when moving along the route of travel 29. Creating the connection schedule by the mobile device 4 in accordance with an embodiment of the present disclosure is discussed in detail with reference to FIG. 4.

Figure 4:
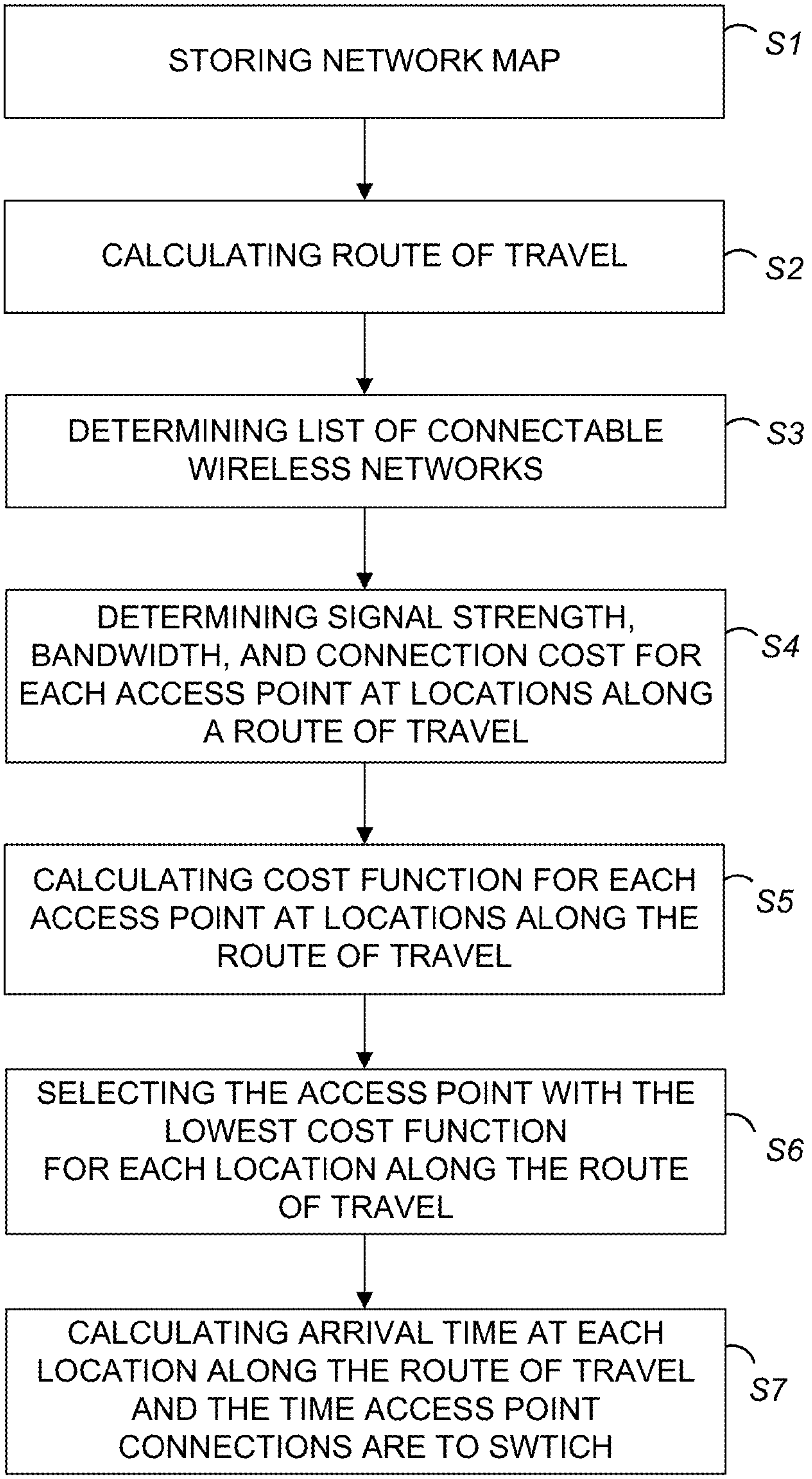
FIG. 4 is an exemplary method and algorithm for creating a schedule for connecting the mobile device to wireless networks at locations along the route of travel.

FIG. 4 is an exemplary method and algorithm for creating a schedule for connecting the mobile device 4 to connectable wireless networks at locations along a route of travel according to an embodiment of the present disclosure. FIG. 4 illustrates exemplary operations performed when the mobile device 4 runs software 13 stored in the memory 10 to create a connection schedule. A user may cause the mobile device 4 to run the software 13 or the mobile device 4 may automatically run the software 13. The exemplary method and algorithm of FIG. 4 also includes operations that may be performed by, for example, the software 13 executed by the controller 11 of the mobile device 4, the software 21 executed by the controller 19 of the central server 1, and the monitoring software 28 executed by the controller 27 of the monitoring server 3.

In step S1, the software 13 executed by the controller 11 causes the mobile device 4 to download the network map from the central server 1 and store the downloaded network map as data 12 in the memory 10. It is contemplated by the present disclosure that the access points included in the network map, the operating range or footprint of each access point, and the cost of connecting to each access point are continuously monitored and updated using the central server 1. Additionally, the software 21 executed by the controller 19 can cause the central server 1 to monitor connections and conditions reported by the mobile device 4 and use such information to form a better estimation of network conditions at any location along a route of travel. As the central server 1 updates the network map, mobile device 4 receives the updates via the network interface 8 and connection **5*a***.

Next, in step S2, the software 13 executed by the controller 11 causes the mobile device 4 to calculate the route of travel 29 based on movement data of the mobile device 4. Such movement data includes, but is not limited to, the location, acceleration, velocity, and heading of the mobile device 4.

The current movement data may be evaluated to determine consistency with different modes of travel like automobile, bicycle, pedestrian, bus or rail. For example, an acceleration from twenty (20) miles per hour (mph) to sixty-five (65) mph in under ten (10) seconds, a velocity of sixty-five (65) mph, and a location near or on a highway may be consistent with an automobile. Thus, for such movement data the mode of transportation may be an automobile. For a lower acceleration and velocity at the same location the mode of transportation may be a bus. The mode of transportation may also be determined based on a current location and historical velocity of the mobile device 4 at or near the location.

The software 13 executed by the controller 11 may also cause the mobile device 4 to communicate with the central server 1 via the network interface 8 and connection **5*a* in order to compare the movement data against mapping data stored in the memory 18 of the central server memory 1 to calculate the route of travel 29. For example, for movement data consistent with an automobile the current location and heading may be compared against road map data stored in the memory 18 to determine whether the mobile device 4 is following a particular road. If so, the particular road may be the route of travel 29. Additionally, or alternatively, the mobile device 4 may compare the movement data against historical movement data 12 of the mobile device 4 stored in the memory 10 to determine the route of travel 29**.

It is contemplated by the present disclosure that some movement data, for example, acceleration and velocity, may be used for determining consistency with a mode of transportation while other movement data, for example, location and heading, may be used for determining the actual route of travel. Some movement data, for example, location may be used for both.

In step S3, the software 13 executed by the controller 11 causes the mobile device 4 to determine a list of wireless networks that are connectable to the mobile device 4 based on the stored network map and the route of travel 29. For example, the mobile device 4 may compare the route of travel 29 against the stored network map to determine wireless networks that may be connectable to the mobile device 4 while the mobile device 4 travels along the route of travel 29. For each determined wireless network, the mobile device 4 also determines a corresponding access point. A connectable wireless network is a wireless network whose access point has adequate signal strength and available bandwidth to provide quality service to the mobile device 4 based on use of the mobile device 4 while moving along the route of travel 29.

In step S4, the software 13 executed by the controller 11 causes the mobile device 4 to analyze the network data to determine the signal strength of each access point, the available bandwidth of each access point, and the cost of connecting to each access point for locations along the route of travel 29.

Signal strength is measured in dBm (decibel-milliwatts) and can range between −30 dBm and −90 dBm. The minimum acceptable strength for maintaining a reliable connection is usually about −70 dBm which accommodates light Internet browsing and email service. However, for uses with higher data demands such as, but not limited to, conducting video calls the minimum acceptable strength for maintaining a reliable connection is usually about −67 dBm. It is contemplated by the present disclosure that the software 13 executed by the controller 11 causes the mobile device 4 to determine acceptable signal strength based on current use of the mobile device 4.

Thus, for example, for a mobile device 4 conducting a video call the minimum acceptable signal strength is −67 dBm. The signal emitted by the access point of a connectable wireless network should be strong enough at any location along the route of travel to support the current use of the mobile device 4. The strength of the signal received by the mobile device may facilitate determining the connection time between the mobile device 4 and an access point because the mobile device 4 can maintain the connection for as long as the signal strength is strong enough to support the current use of the mobile device 4.

Bandwidth refers to the transmission capacity of a network connection and is measured as the amount of data that can be transferred from one point to another within a network within a specified time. Bandwidth is typically measured in bits per second (bps) and may be calculated by measuring throughput on an Internet Protocol (IP) network between two hosts and measuring traffic between different interfaces.

The maximum bandwidth for standard 802.11 protocols ranges from 11 Megabits per second (Mbps) to 600 Mbps, for 3G the bandwidth ranges from 7.2 Mbps to 42 Mbps, and for 4G-LTE the maximum bandwidth is 1 Gbps or higher. High definition (HD) video conferencing and HD movie streaming typically require a bandwidth of about 4 Mbps, streaming videos require a bandwidth of about 0.7 Mbps, and email service and Internet browsing typically require a bandwidth of about 0.5 Mbps. It is contemplated by the present disclosure that the software 13 executed by the controller 11 causes the mobile device 4 to determine acceptable bandwidth based on current use of the mobile device 4. Thus, for example, for a mobile device 4 conducting a video call the minimum acceptable bandwidth is about 4 Mbps.

The costs for accessing any wireless network may depend on the terms of a user's plan with a wireless network service provider. Wireless networks operated by the user's service provider can typically be connected to affordably. However, for wireless networks operated by different service providers, connection costs and additional costs based on data usage and/or connection time may be incurred. For example, costs of connecting to networks during high usage times when less bandwidth is available are typically greater than connecting during low usage times when more bandwidth is available.

The signal strength, available bandwidth, and connection costs for each access point and associated wireless network can be evaluated based on current use of the mobile device 4 at any location along the route 29 to create a position-cost schedule for each access point and a connection schedule. Because the connection time is related to the signal strength, the connection time can also be evaluated instead of, or in addition to, the signal strength.

Next in step S5, the software 13 executed by the controller 12 causes the mobile device 4 to calculate, for example, a cost function value for each access point and all locations along the route of travel 29. Different cost function values may be calculated for and assigned to different combinations of signal strength, available bandwidth, and connection costs. For example, an access point that provides a strong signal and ample available bandwidth at low cost to a location along the route 29 may be assigned a low cost function value. A different access point that provides a weak signal and limited available bandwidth at a high cost to the same location may be assigned a high cost function value. Thus, it should be understood that some locations may be served by multiple access points and as a result may be associated with multiple cost function values. The locations and corresponding cost function values for each access point may be summarized in a position-cost schedule.

In step S6, the software 13 executed by the controller 11 causes the mobile device 4 to select for each location along the route of travel 29, the access point with the lowest cost function value. Next, in step S7, the software 13 executed by the controller 11 causes the mobile device 4 to calculate the arrival time at each location along the route of travel 29 and the time at which connections between access points are to switch, for example, using the route of travel 29 and the velocity of the mobile device 4. The arrival and switching times may alternatively be calculated in any manner. The locations and corresponding cost function values may be summarized in a connection schedule. It is contemplated by the present disclosure that while moving along the route of travel 29, the software 13 executed by the controller 11 causes the mobile device 4 to continuously monitor the route of travel 29, map of available networks, and usage of the mobile device 4 to continuously recalculate cost function values for each location along the route of travel 29 for each access point, which in turn forces a continuous recalculation and adjustment of the connection schedule. FIG. 5 is an exemplary position-cost schedule 43 for the access point AA including example locations 30-35 along the route of travel 29 and a cost function value (CFV) 44 corresponding to each location. As shown in the position-cost schedule 43, location 31 has a low CFV of one (1), locations 32 and 33 have a CFV of two (2), location 34 has a CFV of four (4), and locations 30 and 35 have a CFV of five (5). The position-cost schedule 43 may be stored as data 12 in the memory 10 of the mobile device 4.

The software 13 executed by the controller 12 causes the mobile device 4 to calculate a CFV 44 for each location along the route of travel 29 based on the signal strength, available bandwidth, and connection costs at the respective location. Alternatively, or additionally, the CFVs 44 may be calculated using any data relevant to enhancing wireless network connectivity.

An access point that provides a strong signal and ample available bandwidth at low cost to a location along the route of travel 29 may be assigned a low cost function value. For example, location 31 has a low CFV thus it can be seen that access point AA likely provides a strong signal and ample available bandwidth at low cost to location 31. An access point that provides a weak signal and low available bandwidth at high cost to a location along the route 29 may be assigned a high cost function value. For example, location 35 has a high CFV thus it can be seen that access point AA likely provides a weak signal and low available bandwidth at high cost to location 35.

It is contemplated by the present disclosure that many different combinations of different signal strength, different available bandwidth and connection costs may be evaluated to yield different CFVs 44. Moreover, it is contemplated by the present disclosure that the CFVs 44 may be calculated in any manner using any data relevant to wireless network connectivity, and that the CFVs 44 may be used in any manner that facilitates enhancing wireless network connectivity of the mobile device 4 while moving along the route of travel 29.

FIG. 6 is an exemplary position-cost schedule 45 for the access point BB including example locations 31-40 along the route of travel 29 and a cost function value (CFV) 44 corresponding to each location. As shown in the position-cost schedule 45, location 31 has a high CFV of five (5), locations 32 and 39 have a CFV of four (4), locations 33 and 38 have a CFV of three (3), location 34 has a CFV of two (2), and locations 35-37 have a low CFV of one (1). The CFVs 44 shown in the position-cost schedule 45 are calculated in the same way as described herein for the CFVs included in the position-cost schedule 43 for access point AA. The position-cost schedule 45 may be stored as data 12 in the memory 10 of the mobile device 4 similar to the position-cost schedule 43.

FIG. 7 is an exemplary position-cost schedule 46 for the access point CC including example locations 36-41 along the route of travel 29 and a cost function value CFV) 44 corresponding to each location. As shown in the position-cost schedule 46, location 36 has a high CFV of five (5), location 37 has a CFV of four (4), locations 38 and 39 have a CFV of two (2), location 40 has a CFV of one (1), and location 41 has a high CFV of five (5). The CFVs 44 shown in the position-cost schedule 46 are calculated in the same way as described herein for the CFVs included in the position-cost schedule 43 for access point AA. The position-cost schedule 46 may be stored as data 12 in the memory 10 of the mobile device 4 similar to the position-cost schedules 43 and 45.

After the CFVs 44 for each access point and location along the route of travel 29 are calculated, the software 13 executed by the controller 11 causes the mobile device 4 to select for each location the access point with the lowest CFV 44. For example, at location 31 the mobile device 4 may connect to access point AA or BB while moving along the route of travel 29. The CFV 44 for connecting to access point AA is one (1) while the CFV 44 for connecting to access point BB is five (5). Because the CFV 44 for access point AA is less than that for access point BB, access point AA is selected for connection at location 31. As another example, at location 38 the mobile device 4 may connect to access point BB or CC. The CFV 44 for connecting to access point BB is three (3) while the CFV 44 for connecting to access point CC is two (2). Because the CFV 44 for access point CC is less than that for access point BB, access point CC is selected for connection at location 38.

The arrival time at each location along the route of travel 29 and the time at which connections between access points are to instantaneously switch can be calculated, for example, using the route of travel 29 and the velocity of the mobile device 4. The selected access points and corresponding locations along the route of travel 29, as well as the calculated switching times can constitute a connection schedule.

Although a strong signal, ample bandwidth and low cost warrant a low CFV 44 as described herein, it is contemplated by the present disclosure that any scheme for calculating CFVs 44 and any scheme of comparing CFV values may be implemented that facilitates determining the optimal wireless network and corresponding access point to connect to at a given location. For example, in an alternative embodiment a strong signal, ample bandwidth and low cost may alternatively be assigned a high CFV 44, while a weak signal, low available bandwidth, and high cost may be assigned a low CFV 44. In such an alternative embodiment the highest CFV 44 may be selected to determine the optimal wireless network connection.

FIG. 8 is an exemplary connection schedule 47 that includes locations 30-41 along the route of travel 29 and corresponding selected access points 48 and the times 49 at which the mobile device 4 seamlessly switches the connection from one access point to a different access point such that a connection to at least one wireless network is always maintained along the route of travel 29. According to the connection schedule 47, the mobile device 4 is connected to one access point at a time. For example, while moving along the route of travel 29, at location 33 the mobile device 4 can connect to access point AA. Upon arriving at location 34, the mobile device 4 switches seamlessly to a connection with access point BB. Instead of switching the connection based on the location of the mobile device 4, the switch may be based on the calculated time the mobile device 4 is to arrive at a given location. For example, for location 34 according to the connection schedule 47 at 2:30 PM the mobile device 4 is seamlessly switched to a connection with access point BB.

As another example, at location 37 the mobile device 4 is seamlessly switched to a connection with access point BB. Upon arriving at location 38, the mobile device 4 is seamlessly switched to a connection with access point CC. Alternatively, the switch may occur based on the time the mobile device 4 is to arrive at location 38, which according to the connection schedule 47 is 3:30 PM.

Thus, for each location along the route of travel 29, the mobile device 4 connects to the corresponding access point in accordance with the connection schedule such that an optimum connection to at least one wireless network is always maintained along the route of travel 29. By virtue of connecting to an access point, the mobile device 4 connects to the connectable wireless network associated with that access point. The connection schedule 47 may be stored as data 12 in the memory 10 of the mobile device 4.

Although the connection schedule 47 includes a switch time 49 for seamlessly switching from one access point to another such that the mobile device 4 is connected to one access point at a time, it is contemplated by the present disclosure that for each location the connection schedule 47 may alternatively, or additionally, include a time for connecting to a next access point and a different time for disconnecting from, or dropping, a current connection to a current access point. Using a connection time and a disconnection time facilitates simultaneously connecting the mobile device 4 to more than one access point while switching connections between access points such that switching between access points is more likely to occur seamlessly.

For example, for location 31 instead of switching from access point AA to access point BB at 2:30 PM, at a predetermined time before 2:30 PM, the mobile device 4 may also connect to access point BB and then may disconnect from access point AA a predetermined time after 2:30 PM. The predetermined period of time may be forty-five (45) seconds or any period of time deemed adequate to facilitate ensuring a seamless switch between access points. Additionally, the predetermined time for connecting to the next access point may be different than the predetermined time for disconnecting from the current access point.

It is contemplated by the present disclosure that the position-cost schedule for each access point and the connection schedule 47 may be continuously updated to reflect changes in the signal strength, available bandwidth, and connection costs of access points that may occur while the mobile device 4 moves along the route of travel 29. Accordingly, while moving along the route of travel 29, the software 13 executed by the controller 11 causes the mobile device 4 to continuously monitor the route of travel, map of available networks, and usage of the mobile device 4 to continuously recalculate CFVs 44 for each location along the route of travel 29 for each access point, which in turn forces a continuous recalculation and adjustment of the connection schedule 47.

For example, when access point BB becomes congested an updated position-cost schedule for access point BB would include higher CFVs 44 due to the increase in connection costs resulting from the congestion. The updated connection schedule 47 might result in immediately switching from access point BB to another access point. If the CFV 44 at location 37 increased to five (5) for access point BB, then an updated connection schedule 47 might include immediately switching to access point CC because the CFV 44 at location 37 from access point CC is lower. Such continuous updating also updates the switch times and alternatively, or additionally, the connection and disconnection times 49. The route of travel 29 may also be continuously monitored for any changes such that the route of travel 29 may be recalculated upon a change.

By dynamically switching connections between wireless networks via the corresponding access points in accordance with the schedule 47, network connections are switched seamlessly before the quality of a wireless network connection deteriorates and drops off. As a result, the connectivity of the mobile device 4 between wireless networks is enhanced, service is improved, and user inconvenience is reduced.

Figure 9:
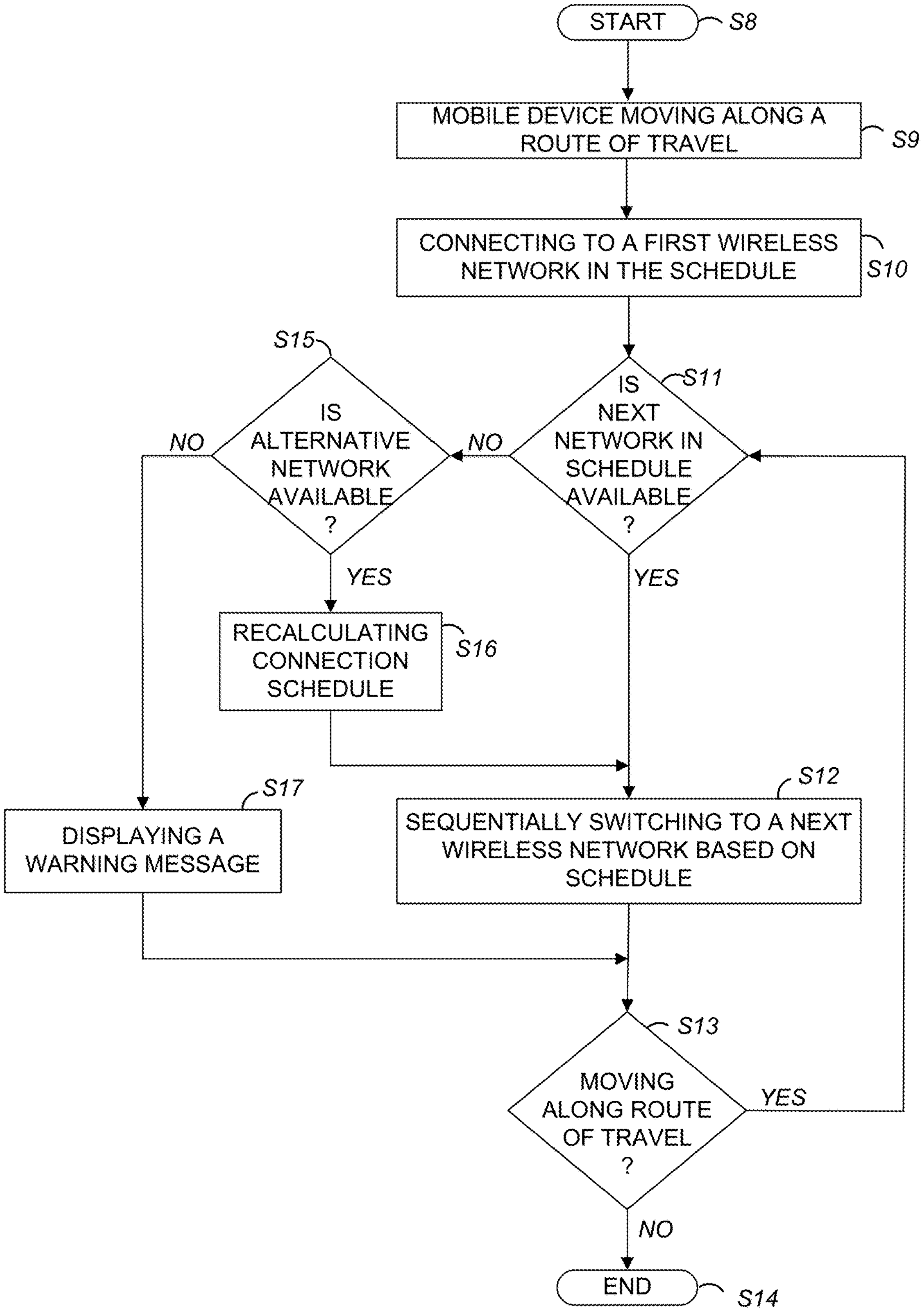
FIG. 9 is an exemplary method and algorithm for enhancing mobile device connectivity between wireless networks according to an embodiment of the present disclosure.

FIG. 9 is an exemplary method and algorithm for enhancing mobile device connectivity between wireless networks in accordance with an embodiment of the present disclosure. The exemplary method and algorithm of FIG. 9 also includes operations that may be performed by, for example, the software 13 executed by the controller 11 of the mobile device 4, the software 20 executed by the controller 19 of the central server 1, and the monitoring software 28 executed by the controller 27 of the monitoring server 3.

The method starts in step S8 and in step S9 the mobile device 4 is moving along a route of travel calculated in accordance with the method and algorithm described herein with regard to FIG. 4.

In step S10, the software 13 executed by the controller 11 causes the mobile device 4 to calculate its initial location; and, using the network interface 8 and connection 5*a*, connect to the access point (e.g. AA, BB, or CC) and associated wireless network (e.g., A, B, or C) corresponding to the initial location in accordance with the connection schedule 47. The wireless network associated with the corresponding access point is considered to be the first wireless network. The connection schedule can be calculated in accordance with the method and algorithm described herein with regard to FIG. 4 and can be as described herein with regard to FIG. 8.

It is contemplated by the present disclosure that the connection schedule may be continuously updated, or recalculated, to reflect changes in the signal strength, available bandwidth, and connection costs of access points that may occur while the mobile device 4 moves along the route of travel. Accordingly, while moving along the route of travel the optimal network connection application software 13 executed by the controller 11 causes the mobile device 4 to continuously calculate CFVs 44 (i.e., as described herein with regard to FIG. 4 and as shown in FIGS. 5-7) for each location along the route of travel, for each access point, and continuously update the connection schedule. Such continuous updating also updates the switch times and alternatively, or additionally, the connection and disconnection times.

In step S11, the monitoring software 28 executed by the controller 29 of the monitoring server 3 causes the monitoring server 3 to detect whether or not any access point in the connection schedule is experiencing an outage or is otherwise unavailable. If the access point for a wireless network is unavailable, the monitoring server 3 can transmit a message to the mobile device 4 using the network interface 24 and the connection 5*b*.

The message can indicate which access point is unavailable and can provide alternative available access points as well as data regarding the available access points. Such data may include, but is not limited to, signal strength, connection costs and available bandwidth. The message can be transmitted immediately upon detecting the outage or within a predetermined time period of detecting the outage. For example, the predetermined period of time may be thirty (30) seconds or any time period deemed adequate to update the connection schedule and enable the mobile device 4 to be continuously connected to wireless networks while moving along the route of travel.

If the access point in the connection schedule for the next wireless network is available, in step S12, the software 13 executed by the controller 11 causes the mobile device 4 to sequentially switch to the next available wireless network via the next available access point in the connection schedule. Such sequential connection switching facilitates maintaining a continuous connection between the mobile device 4 and wireless networks via the respective access points while moving along the route of travel.

In step S13, the software 13 executed by the controller 11 causes the mobile device 4 to determine if it is still moving along the route of travel. If so, in step S11, the monitoring software 28 executed by the controller 29 of the monitoring server 3 causes the monitoring server 3 to detect whether or not the access point of any of the wireless networks in the schedule is experiencing an outage or is otherwise unavailable. Otherwise, in step S14, the method and algorithm end.

In step S11, if the next access point and wireless network are not available, in step S15, the software 13 executed by the controller 11 causes the mobile device 4 to analyze the message received from the monitoring server 3 to determine if at least one other access point (e.g., alternate access point) and associated wireless network are available. If so, in step S16, the controller causes the mobile device 4 to update, or recalculate, the connection schedule and sequentially switch to the next wireless network via the next access point in the recalculated connection schedule.

However, if at least one other access point and associated wireless network are not available, in step S17, the software 13 executed by the controller 11 causes the mobile device 4 to display a warning message using the user interface 7. The warning message may be a notification that wireless network service is unavailable and may indicate the time until a wireless network becomes available while moving along the route of travel and/or any other information deemed relevant to wireless network connectivity and/or deemed useful to the user.

Next, in step S13, the software 13 executed by the controller 11 causes the mobile device 4 to determine if it is still moving along the route of travel. If so, in step S11, the monitoring software 28 executed by the controller 29 of the monitoring server 3 causes the monitoring server 3 to detect whether or not the access point of any of the wireless networks in the schedule is experiencing an outage or is otherwise unavailable. Otherwise, in step S14, the method and algorithm end.

Using the method and algorithm for enhancing mobile device wireless network connectivity facilitates allowing users to dynamically, conveniently, and inexpensively seamlessly switch connections between wireless networks in accordance with a connection schedule while moving along a route of travel. By dynamically switching connections between wireless networks via the corresponding access points in accordance with the schedule 47, network connections are switched seamlessly before the quality of a wireless network connection deteriorates and drops off. As a result, the connectivity of the mobile device 4 between wireless networks is enhanced, service is improved, and user inconvenience is reduced.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 4 and FIG. 9. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. A network device for enhanced network connectivity to wireless networks comprising:

a user interface;

a hardware processor; and a non-transitory memory configured to store one or more programs, the hardware processor executes the one or more programs to:

store a map of wireless networks for an electronic device;

calculate a route of travel for the electronic device;

determine a list of access points for the wireless networks connectable to the electronic device based on the map and the route of travel;

calculate a cost function for each of the access points on the list based on optimization factors including signal strength, available bandwidth, connection times, and connections costs at the connection times;

create a schedule for connecting the electronic device to the access points for the wireless networks based on locations of the electronic device along the route of travel and the cost function related to connecting to each of the access points at each of the locations; and transmit the schedule to the electronic device via a network connection, wherein the electronic device uses the received schedule to sequentially switch from a first one of the access points to a next one of the access points on the schedule so the electronic device is connected to at least one of the wireless networks while moving along the route of travel.

2. The network device according to claim 1, wherein the determining of the list of wireless networks includes the hardware processor executing the one or more programs to determine locations along the route of travel of access points for each wireless network on the list of wireless networks connectable to the electronic device.

3. The network device according to claim 1, wherein the creating of the schedule includes the hardware processor executing the one or more programs to select one access point for each location along the route of travel.

4. The network device according to claim 1, wherein the calculating of the route of travel includes the hardware processor executing the one or more programs to determine a mode of transportation based on a current location and historical velocity of the electronic device.

5. The network device according to claim 1, wherein unavailability of a network on the list of wireless networks is provided to the electronic device based on information received from a network monitoring server.

6. A method implemented by a network device for enhanced connectivity to wireless networks comprising:

storing a map of wireless networks for an electronic device;

calculating a route of travel for the electronic device;

determining a list of access points for the wireless networks connectable to the electronic device based on the map and the route of travel;

calculating a cost function for each of the access points on the list based on optimization factors including signal strength, available bandwidth, connection times, and connections costs at the connection times;

creating a schedule for connecting the electronic device to the access points for the wireless networks based on locations of the electronic device along the route of travel and the cost function related to connecting to each of the access points at each of the locations; and transmitting the schedule to the electronic device via a network connection, wherein the electronic device uses the received schedule to sequentially switch from a first one of the access points to a next one of the access points on the schedule so the electronic device is connected to at least one of the wireless networks while moving along the route of travel.

7. The method according to claim 6, the determining a list step further comprising determining locations along the route of travel of access points for each wireless network on the list of wireless networks connectable to the electronic device.

8. The method according to claim 6, the creating step further comprising selecting one access point for each location along the route of travel.

9. The method according to claim 6, the calculating step comprising determining a mode of transportation based on a current location and historical velocity of the electronic device.

10. The method according to claim 6, wherein unavailability of a network on the list of wireless networks is provided to the electronic device based on information received from a network monitoring server.

11. A non-transitory computer-readable recording medium in a network device for enhanced network connectivity to wireless networks comprising, the non-transitory computer-readable recording medium storing one or more programs which when executed by a hardware processor perform steps comprising:

storing a map of wireless networks for an electronic device;

calculating a route of travel for the electronic device;

determining a list of access points for the wireless networks connectable to the electronic device based on the map and the route of travel;

calculating a cost function for each of the access points on the list based on optimization factors including signal strength, available bandwidth, connection times, and connections costs at the connection times;

creating a schedule for connecting the electronic device to the access points for the wireless networks based on locations of the electronic device along the route of travel and the cost function related to connecting to each of the access points at each of the locations; and transmitting the schedule to the electronic device via a network connection, wherein the electronic device uses the received schedule to sequentially switch from a first one of the access points to a next one of the access points on the schedule so the electronic device is connected to at least one of the wireless networks while moving along the route of travel.

12. The non-transitory computer-readable recording medium according to claim 11, wherein determining a list further comprises determining locations along the route of travel of access points for each wireless network on the list of wireless networks connectable to the electronic device.

13. The non-transitory computer-readable recording medium according to claim 11, wherein creating the schedule further comprises selecting one access point for each location along the route of travel.

14. The non-transitory computer-readable recording medium according to claim 11, wherein calculating the route of travel comprises determining a mode of transportation based on a current location and historical velocity of the device.

15. The non-transitory computer-readable recording medium according to claim 11, wherein unavailability of a network on the list of wireless networks is provided to the electronic device based on information received from a network monitoring server.

16. The network device according to claim 1, wherein the electronic device is a mobile device.

17. The method according to claim 6, wherein the electronic device is a mobile device.

18. The non-transitory computer-readable recording medium according to claim 11, wherein the electronic device is a mobile device.

* * * * *